Dec. 4, 1945.  W. K. JAHN  2,390,257
DISAPPEARING HANGER
Filed Aug. 21, 1944
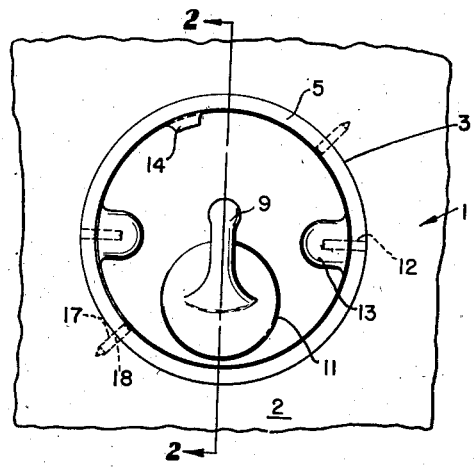
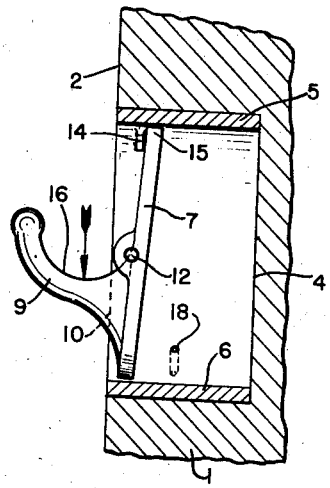 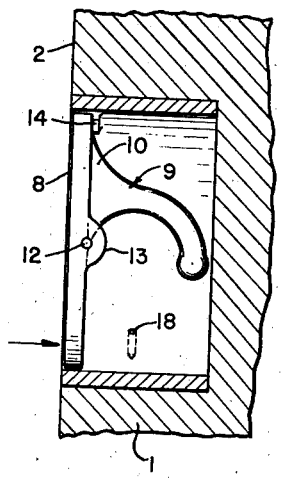
WALTER K. JAHN, Inventor Patented Dec. 4, 1945

2,390,257

UNITED STATES PATENT OFFICE 2,390,257

DISAPPEARING HANGER

Walter K. Jahn, Los Angeles, Calif.

Application August 21, 1944, Serial No. 550,467

7 Claims. (Cl. 248—294)

This invention relates to hangers for articles, such as articles of clothing, or the like, and the device would be useful in many situations, particularly in small traveling compartments, such as on trains or transport aircraft where the hanger can be mounted so that it can be used temporarily when needed, but constructed so that when not needed it can be moved into a concealed position.

One of the objects of the invention is to provide a hanger of this character which has a construction adapting it for being quickly mounted in a socket provided for it in a wall or in the face of a door; also to construct the device so that when the hook is not in use, the member carrying the hook will present its outer face substantially flush with the outer face of the wall or door in which the device is mounted.

An object of the invention is to provide a construction for the device which will enable it to be secured in place without having any removable fastening device presented or accessible at the outer face of the wall or door where the device is attached; also to provide simple means for securing the device in its socket in such a way that it can only be removed from the socket with great difficulty, the general purpose being to prevent unauthorized removal of the device from its support.

Another object of the invention is to provide a device of this character whose principal parts are adapted to be molded of plastic material and to construct the device so that the hook-carrying member or panel of the device will hold itself by gravity, in an active position or in its concealed position for the hook, thereby avoiding the necessity for employing any spring or other means for holding the hook in its two extreme positions.

Further objects of the invention will appear hereinafter.

The invention consists in the novel parts and combination of parts, to be described hereinafter, all of which contribute to produce an efficient disappearing hanger.

A preferred embodiment of the invention is described in the following specification, while the invention is particularly set forth in the appended claims.

In the drawing,

Fig. 1 is a front elevation of the device showing it in its open or active position on the face of a support, such as a wall or door, which is represented as broken away.

Fig. 2 is a vertical section taken about on the line 2—2 of Fig. 1, but this section passes only through the supporting wall and the frame of the device, its rotatable panel being shown in edge elevation.

Fig. 3 is a view similar to Fig. 2, but showing the panel and hook rotated into its closed or folded position in which the hook is concealed within the wall socket.

In practicing the invention, a socket should be provided in a supporting wall 1 which may be an ordinary wall, but preferably a wall which, at the point of attachment of the device will have a solid interior, such as would be presented by a post or door. In the forward face 2 of this supporting wall, the socket is formed to receive this device, and although this socket may be of any desired shape, in the present instance it is illustrated as a circular socket 3. This form for the socket is very advantageous because it can be readily cut in the face of the wall or door by a rotating tool. It should have a bottom face 4 extending across it at the full depth of the socket; in other words, the bottom face should be a plane face substantially parallel with the outer face 2 of the supporting wall.

The device itself comprises a hanger frame 5 which in the present instance is of circular form to fit into the bore of the socket 3. In other words, this frame 5 presents an annular peripheral wall surrounding a bore 6 in which the hanger proper is mounted. This hanger preferably consists of a panel 7 which in the present instance is in the form of a circular disc that, in the closed position shown in Fig. 3, presents a flat outer face 8 that is substantially flush with the outer face 2 of the supporting wall. On its other side, that is, its inner side, as illustrated in Fig. 3, the panel or disc 7 is provided with an integral hook 9, and this hook and the disc are particularly adapted to be molded of a plastic material; and in order to give the disc and hook considerable strength to support a heavy article, the root 10 of the hook at the point where it merges into the disc is considerably thicker so that it has a very considerable diameter as indicated in Fig. 3 and also by the circular line 11 indicated in Fig. 1.

At diametrically opposite points and on the substantially horizontal medial axis of the disc 8, I provide pivotal supports, preferably consisting of two metal pins 12 that are inserted through the peripheral wall of the frame 5 from the outside. The inner ends of the same are embedded in bosses or abutments 13 that project from the disc 8 on the same side as the hook 9.

In order to maintain the hanger member in its folded position, illustrated in Fig. 3, as well as in its active position illustrated in Fig. 2, I prefer to provide the wall of the frame 5 with an inwardly projecting stop 14, which stop is preferably located near the upper edge of the frame 5, but shifted slightly to one side of the vertical plane in which the hook 9 swings when the disc is being rotated between its two extreme positions. In other words, the stop is located out of the path of the hook.

Referring to Fig. 3, it will be evident that in the folded or concealed position for the hook 9 the weight of the hook will be exerted along a line located to the right of the pivot pin 12, as viewed in Fig. 3, and this of course means that the hook will maintain the panel in this position by the action of gravity.

When the hook is to employed, it is merely necessary to exert a slight push upon the lower portion of the disc at about the location of the arrow in Fig. 3, whereupon the hook will flop over to an outward position, and the panel will come to rest in a position such as that indicated in Fig. 2, at which time the edge 15 of the disc which was formerly the lower edge, will now engage the stop 14 from the rear side. The hook 9 will now operate, even if no article is hung upon it, to maintain the panel 7 in this position of rest.

In constructing the hook 9, it is preferable to provide a concave interior profile such as indicated by the concave line 16, that will have its lowest point as near as possible to the vertical plane passing through the pivot 12. This is advantageous because it reduces the virtual lever arm for the weight of the article that may be hung on the hook, which load would be applied substantially in the position of the arrow indicated in Fig. 2. This is also advantageous because it brings the point of application of the load as near as possible to the expanded or enlarged root 10 of the hook where the hook has its greatest strength.

The frame 5 is preferably secured in position in its socket by means that cannot readily be removed even if the panel 7 is rotated into an intermediate position which would give access to the interior of the socket. This prevents the device from being removed by a petty thief or by a person unauthorized to remove the device. In order to accomplish this I prefer to provide the peripheral wall of the frame 5 with one or more small openings such as the openings 17 (see Fig. 1) which are disposed radially, and which afford opportunity to insert pointed fasteners or pins 18 that would be pressed or driven outwardly from the interior of the socket through these openings into the material of the wall. These pins 18 are preferably headless so that the butt end of each pin, after the pin is driven, will either be flush with the inner face of the peripheral wall of the frame, or "depressed" below the same. The use of these pins makes it practically impossible for a person to pull the device out of the socket without using great force, and without destroying the integrity of the peripheral wall of the frame 5.

It will be evident that this device can be very inexpensively manufactured and produced in great quantities at a low cost. The fact that the device is formed of a plastic material makes it possible to give the device any desired color to have it match with the color of the face of the wall if desired, or to give any desired artistic effect in a color scheme.

This device is intended to be attached to the face of a wall that is always in a vertical or upright position.

Many other embodiments of this invention may be resorted to without departing from the spirit of the invention.

I claim as my invention:

1. In a disappearing hanger construction, adapted to be mounted in a socket in a support presenting a substantially vertical face, the combination of a hanger frame fitting into said socket, having a peripheral wall, and having an opening through the peripheral wall in a relatively inaccessible position; a fastener to pass through said opening from the interior of said frame so as to project into the material of said support; and hanger means including a panel pivotally supported to rotate on an axis located substantially on the medial horizontal axis of said panel; said panel having hanger means projecting from one face of the same; and a stop associated with the frame for maintaining the panel in a rotated, inverted, position with the hanger means concealed in the socket.

2. A disappearing hanger construction according to claim 1, in which the pivotal support for rotation of the panel on its medial horizontal axis includes diametrically oppositely disposed pivot members inserted through the peripheral wall from the outside, extending into the interior of the panel at their inner ends, and having their outer ends flush with, or depressed below, the outer surface of the hanger frame to permit the same to pass into the socket.

3. A disappearing hanger construction according to claim 1, in which the hanger-frame is of annular form, and in which the panel is in the form of a disc having a hook formed integrally therewith on the face of the disc, and located so that when the hook is projecting outwardly in the active position of the hanger, the root of the hook will be located below the said medial horizontal axis on which the disc rotates, whereby in the folded position of the hanger with the hook located within the socket, the root of the hook will be located above the axis of rotation so that the action of gravity will hold the disc in its folded position, said frame having a stop in the path of the edge of the disc for maintaining the disc with the hook in its active, or its concealed, position.

4. In a disappearing hanger construction to be received in a socket extending back from the surface of a wall or a door, the combination of a hanger-frame having a peripheral wall, and shaped to fit into the socket, means to be inserted through the inner face of the peripheral wall, passing through the said wall and into the side of the socket to retain the hanger-frame in the socket; a panel filling the opening in the frame in the closed position of the hanger and presenting a substantially flat face substantially flush with the outer face of the supporting wall or door; means located at diametrically opposite points on the medial horizontal axis of the panel for permitting the same to be rotated into an inverted position, said panel having an integral hook connected with the rear side of the panel above the said axis of rotation when the hanger is in its folded position, said frame having stop means projecting inwardly from said peripheral wall for engaging said panel, to maintain the panel in its closed position, and also operating to resist the weight of an article hung on the hook when the hook is in its active position, disposed on the outer side of the panel.

5. In a disappearing hanger construction adapted to fit into a socket in the face of a wall or door, the combination of an annular frame having a peripheral wall adapted to fit into the socket; a hook panel in the form of a disc, having diametrically oppositely disposed pivot supports located substantially on the medial horizontal axis of the disc, said disc having an integral hook connected with the same at a point above the said pivotal axis when the disc is in its folded position with the hook projecting downwardly within said socket, said peripheral wall having a stop projecting inwardly adjacent to the upper edge of the disc operating as a stop to hold the outer face of the disc substantially flush with the outer face of the wall or door when the hook panel is in its folded position, said stop being located out of line with the path of the tip of the hook when the same is rotated on the axis of rotation, to hold the hook in its active position, and operating as a stop against which the edge of the disc abuts from the inner side to maintain the hook projecting outwardly from the forward face of the wall or door.

6. In a disappearing hanger construction adapted to fit into a socket in the face of a wall or door, the combination of a frame to fit into the socket; a hook panel carried in the frame and capable of substantiallyy filling the opening in the frame, said panel having oppositely disposed pivot supports located adjacent to the medial horizontal axis of the panel, said panel also having an integral hook projecting from the same at a point above the said pivot supports when the panel is in its folded position when the hook is projecting downwardly within said socket, said frame having a stop projecting inwardly adjacent to the upper portion thereof operating as a stop to hold the panel with its outer face substantially flush with the outer face of the wall or door when the hook panel is in its folded position, said stop being located out of line with the hook when the same is rotated on the pivot supports to swing the hook into its active position, and operating as a stop against which the edge of the panel abuts from the inner side to maintain the hook projecting outwardly from the forward face of the wall or door.

7. In a disappearing hanger construction adapted to fit into a socket in the face of a wall or door, the combination of a frame to fit into the socket; a hook panel carried in the frame and capable of substantially filling the opening in the frame, said panel having oppositely disposed pivot supports located adjacent to the medial horizontal axis of the panel, said panel also having a hook projecting from the same at a point above the said pivot supports when the panel is in its folded position when the hook is projecting downwardly within said socket, said frame having a stop projecting inwardly and in a position to engage the edge of the panel to hold it with its outer face substantially flush with the outer face of the wall or door when the hook panel is in its folded position, said stop being located out of line with the hook when the same is rotated on the pivot supports to swing the hook into its active position, and operating as a stop against which the edge of the panel abuts from the inner side to maintain the hook projecting outwardly from the forward face of the wall or door.

WALTER K. JAHN.